(12) United States Patent
Chakravarty et al.

(10) Patent No.: US 7,926,099 B1
(45) Date of Patent: Apr. 12, 2011

(54) COMPUTER-IMPLEMENTED METHOD AND SYSTEM FOR SECURITY EVENT TRANSPORT USING A MESSAGE BUS

(75) Inventors: Dipto Chakravarty, Potomac, MD (US); Usman Choudhary, Springfield, VA (US); Ofer Zajicek, Potomac, MD (US); Srinivasa Phanindra Mallapragada, Ashburn, VA (US); John Paul Gassner, Alexandria, VA (US); Frank Anthony Pellegrino, Greenbelt, MD (US); John Melvin Antony, Falls Church, VA (US); Tao Yu, Chantilly, VA (US); Michael Howard Cooper, Washington, DC (US); William Matthew Weiner, Rockledge, FL (US); Magdalene Ramona Merritt, Myrtle Beach, SC (US); Peng Liu, Boyds, MD (US); Raghunath Boyalakuntla, Falls Church, VA (US); Srivani Sangita, Ashburn, VA (US); Vasile Adiaconitei, Sterling, VA (US); Shahid Saied Malik, Chantilly, VA (US); Karthik Ramu, Alexandria, VA (US); Prathap Adusumilli, Arlington, VA (US); Walter Mathews, Frederick, MD (US); Adedoyin Akinnurun, Glenn Dale, MD (US); Brett Hankins, Manassas Park, VA (US)

(73) Assignee: Novell, Inc., Provo, UT (US)

( * ) Notice: Subject to any disclaimer, the term of this patent is extended or adjusted under 35 U.S.C. 154(b) by 1215 days.

(21) Appl. No.: 11/317,231

(22) Filed: Dec. 27, 2005

Related U.S. Application Data

(60) Provisional application No. 60/699,378, filed on Jul. 15, 2005.

(51) Int. Cl.
*G06F 7/04* (2006.01)
*G06F 15/16* (2006.01)
*G06F 17/00* (2006.01)

(52) U.S. Cl. ............ 726/13; 713/224; 726/22; 709/224; 340/500; 710/112; 710/113

(58) Field of Classification Search .............. 726/22–25, 726/13; 713/187–188, 224; 709/207, 213, 709/224; 340/500; 710/112–113
See application file for complete search history.

(56) References Cited

U.S. PATENT DOCUMENTS

| | | | |
|---|---|---|---|
| 5,630,069 A | 5/1997 | Flores et al. | 395/207 |
| 5,657,245 A | 8/1997 | Hecht et al. | 364/505 |
| 6,205,407 B1 | 3/2001 | Testa et al. | 702/119 |
| 6,208,720 B1 | 3/2001 | Curtis et al. | 379/114 |
| 6,618,766 B1 | 9/2003 | Eshghi | 709/318 |
| 6,779,120 B1 | 8/2004 | Valente et al. | 713/201 |
| 6,792,456 B1 | 9/2004 | Hellerstein et al. | 709/224 |
| 6,807,583 B2 | 10/2004 | Hrischuk et al. | 709/318 |
| 6,839,850 B1 | 1/2005 | Campbell et al. | 713/201 |
| 6,850,820 B2 | 2/2005 | Tajima | 700/286 |

(Continued)

*Primary Examiner* — Kimyen Vu
*Assistant Examiner* — Chi Nguy
(74) *Attorney, Agent, or Firm* — Pillsbury Winthrop Shaw Pittman LLP

(57) ABSTRACT

A computer-implemented device provides security events from publishers to subscribers. There is provided a message bus, configured to contain a plurality of security events. Also provided is a receiver unit, responsive to a plurality of publishers, to receive the plurality of security events from the publishers. There is also a queue unit, responsive to receipt of the security events, to queue the plurality of security events in the message bus. Also, there is a transport unit, responsive to the security events in the message bus, to transport the plurality of security events in the message bus to a plurality of subscribers.

27 Claims, 7 Drawing Sheets

U.S. PATENT DOCUMENTS

| | | | |
|---|---|---|---|
| 6,886,102 B1 | 4/2005 | Lyle | 713/201 |
| 6,983,221 B2 | 1/2006 | Tracy et al. | 702/181 |
| 7,065,493 B1 | 6/2006 | Homsi | 705/8 |
| 7,302,674 B1 | 11/2007 | Gladieux et al. | 717/101 |
| 7,324,108 B2 * | 1/2008 | Hild et al. | 345/440 |
| 7,379,999 B1 | 5/2008 | Zhou et al. | 709/224 |
| 7,444,395 B2 | 10/2008 | Sanghvi et al. | 709/223 |
| 7,457,872 B2 | 11/2008 | Aton et al. | 709/224 |
| 7,565,643 B1 | 7/2009 | Sweet et al. | 717/121 |
| 7,673,335 B1 | 3/2010 | Chakravarty et al. | 726/11 |
| 2002/0087220 A1 | 7/2002 | Tveit et al. | 700/22 |
| 2002/0111824 A1 | 8/2002 | Grainger | 705/1 |
| 2003/0135378 A1 | 7/2003 | Carlson et al. | 705/1 |
| 2003/0172166 A1 | 9/2003 | Judge et al. | 709/229 |
| 2004/0010709 A1 | 1/2004 | Baudoin et al. | 713/201 |
| 2004/0015497 A1 | 1/2004 | Swarna et al. | 707/6 |
| 2004/0138970 A1 | 7/2004 | Ramachandran et al. | 705/34 |
| 2004/0139166 A1 * | 7/2004 | Collison | 709/207 |
| 2005/0005017 A1 | 1/2005 | Ptacek et al. | 709/229 |
| 2005/0086502 A1 * | 4/2005 | Rayes et al. | 713/189 |
| 2005/0160134 A1 | 7/2005 | Childress et al. | 709/200 |
| 2005/0222811 A1 | 10/2005 | Jakobson et al. | 702/183 |
| 2005/0262215 A1 * | 11/2005 | Kirov et al. | 709/207 |
| 2006/0116913 A1 | 6/2006 | Hansan et al. | 705/4 |
| 2006/0130070 A1 | 6/2006 | Graf | 719/318 |
| 2007/0047439 A1 | 3/2007 | An et al. | 370/231 |
| 2007/0180490 A1 | 8/2007 | Renzi et al. | 726/1 |
| 2007/0192853 A1 | 8/2007 | Shraim et al. | 726/22 |
| 2007/0192862 A1 * | 8/2007 | Vermeulen et al. | 726/23 |
| 2008/0016502 A1 | 1/2008 | Henderson et al. | 717/143 |
| 2008/0047009 A1 | 2/2008 | Overcash et al. | 726/23 |

* cited by examiner

COMPUTER-IMPLEMENTED METHOD AND SYSTEM FOR SECURITY EVENT TRANSPORT USING A MESSAGE BUS

RELATED APPLICATIONS

This application claims the benefit to U.S. Provisional Patent Application Ser. No. 60/699,378, entitled "Computer-Implemented Method and System for Security Event Correlation," filed on Jul. 15, 2005, the contents of which are hereby expressly incorporated by reference in their entirety.

BACKGROUND OF THE INVENTION

1. Field of the Invention

The present invention relates in general to computer systems, and more specifically to managing security events that occur in a computing environment.

2. Description of the Related Art

In today's computing environment, threats to the security of computer systems are increasing both in frequency and in complexity. Unfortunately, an organization can lose assets, time, and even customers due to threats that successfully breach its computing environment or that exploit flaws in its information infrastructure.

It would not be unusual for a large installation to have more than two thousand devices included in the security of the network. The timely identification and resolution of security incidents is imperative. However, effectively handling the increasing number of perimeter sources and/or applications and the increasing load of message packets generated from the devices can be overwhelming. Moreover, the ever-growing volumes of data can mask suspicious activity, or limit its detection in a timely fashion.

A conventional database-centric architecture requirements multiple databases, and relies on database mapping to obtain vulnerability information, which affects database performance and further cannot be readily leveraged, such as in reports. This also affects the ability to scale up the architecture to very large environments, since data tends to be accessed through a central point. A representative conventional database-centric architecture is illustrated in the block diagram of FIG. 1. Generally these are set up in a hierarchical architecture, with multiple databases 105, 115, 119 distributed throughout the system to store various security event information. As security events are detected in the system, security event information is stored locally throughout the architecture, such as at each of several local computers 121, each of which can have an event manager process 117 and a database 119 of local security events. Upper level computers 111 can receive information regarding security events from various collections of local computers 121, can process the information at a security event manager 113, and each can store security event information at a local database 115. A divisional manager 125 can manage 123 the upper level computers 111. A user can access security information via a master console manager 101, which includes its manager processing 103 and a local database 105. Alternatively, users can access subsets of security information via divisional consoles 107, which include manager processing 109 and can access the databases of subsets of security events.

The database in a database-centric architecture inherently becomes the bottleneck to performance and scalability. For example, screen refreshes, correlation analyses, and queries require database reads, inserts, or look ups. The amount of users can affect the database's ability to respond in real time when operating at high rates of speed. Unfortunately, database-centric approaches cannot effectively handle event bursts such as can occur during an attack, because the database is relied on for many aspects of event management. Other performance issues can result as well.

BRIEF DESCRIPTION OF THE SEVERAL VIEWS OF THE DRAWING(S)

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

In overview, the present disclosure concerns computer networks and computer systems, such as an intranet, local area network, distributed network, or the like having a capability of detecting security events. Such computer networks and computer systems may further provide services such as communications. A computing network environment can be in communication with various components, generally referred to herein as security components, which include a feature that can detect and provide information on security events. More particularly, various inventive concepts and principles are embodied in systems, devices, and methods therein for providing information associated with security events.

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to reduce bottlenecks created by database-centric architectures. One or more embodiments provides security event processing in a publish-subscribe architecture utilizing a message bus.

Figure 1:
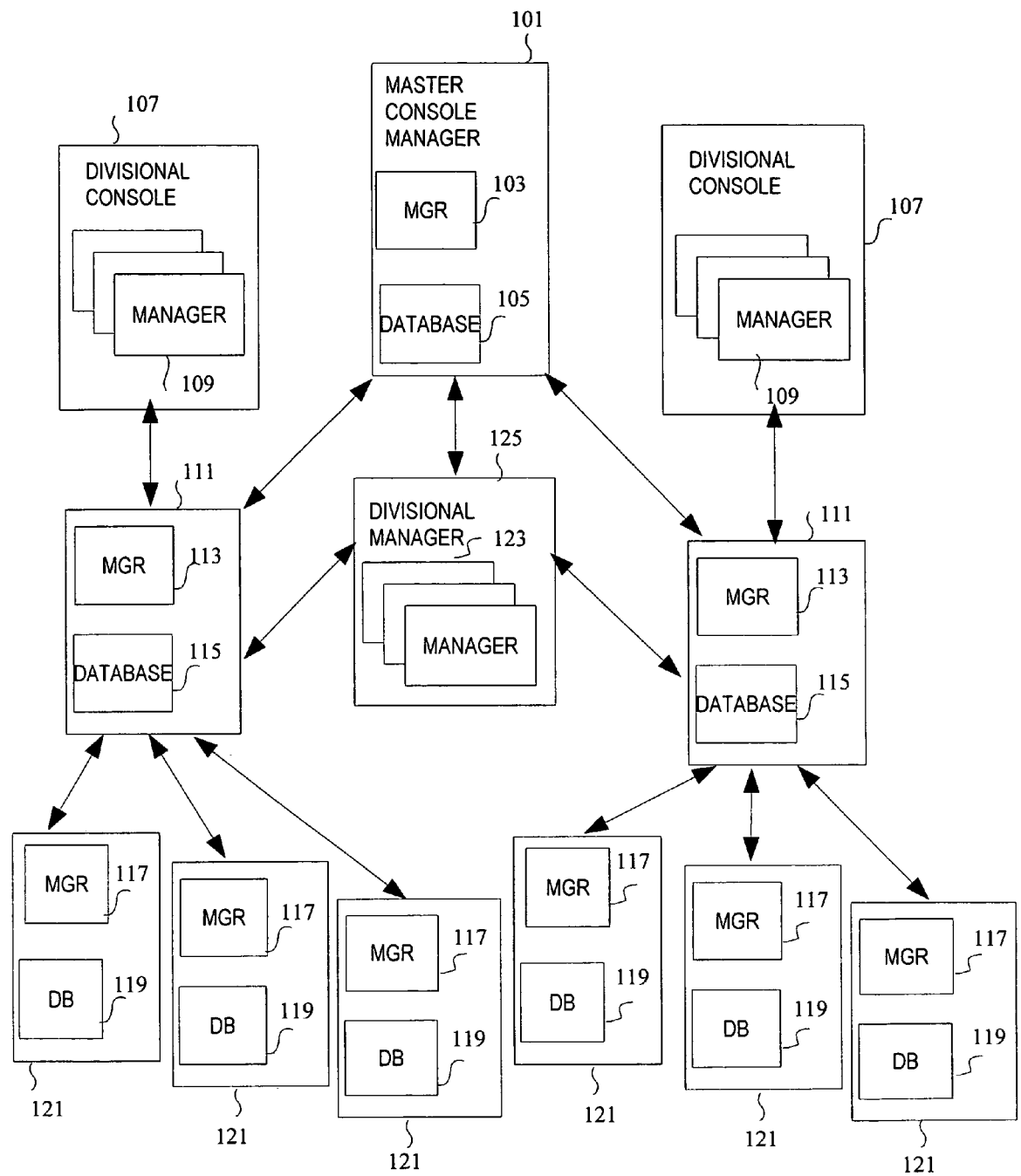
FIG. 1 is a block diagram illustrating a representative prior art computing environment for processing security events.
Figure 2:
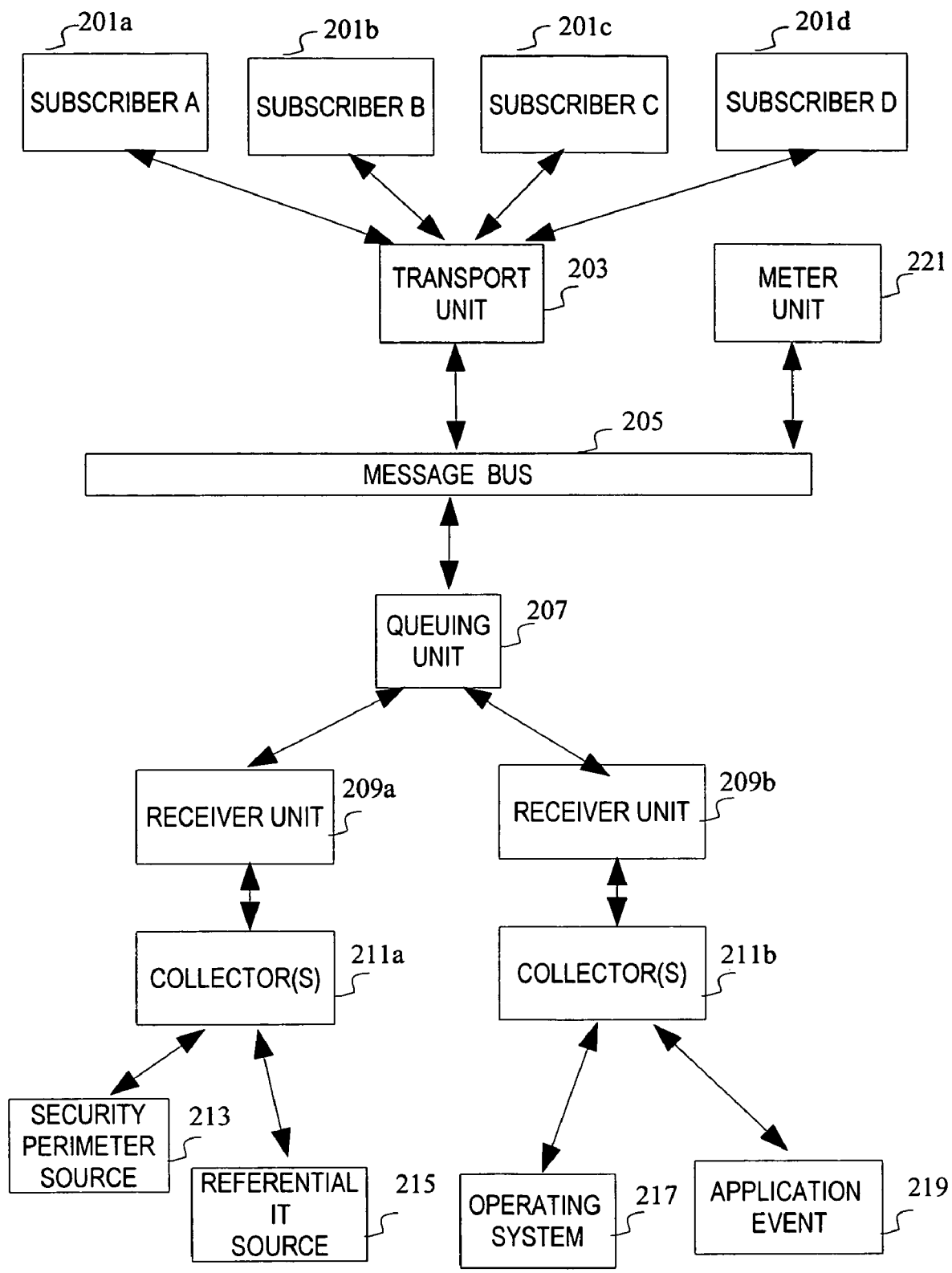
FIG. 2 is a block diagram illustrating a simplified and representative example architecture for use in connection with security events, in accordance with one or more embodiments.

Referring now to FIG. 2, a block diagram illustrating a simplified and representative example architecture for use in connection with security events in accordance with one or more embodiments will be discussed and described. In overview, one or more embodiments provide for a message bus 205, together with a transport unit 203, and/or a queuing unit 207. Security events can be collected and forwarded to the queuing unit 207 to be placed into the message bus 205. The transport unit 203 can be in communication with one or more subscribers, such as subscribers A-D 201a-201d. Security events can be provided, for example in connection with the transport unit 203, to one or more subscribers 201a-201d.

The security events can be provided from security components; in the illustrated example, the security components include a security perimeter source 213, a referential IT source 215, an operating system 217, and an application event 219. The security events are collected by one or more collectors, here represented by collectors 211a, 211b. Here, each of the collectors 211a, 211b collects security events from different security components.

The collectors 211a, 211b can act as publishers, for example by publishing the security events. In the illustrated example, the collectors 211a, 211b provide the collected security events to receiver units, here represented by receiver units 209a, 209b. Accordingly, one or more embodiments provide that the at least one publisher includes a plurality of collectors, each of the collectors collecting data from security components and, responsive to the data, providing the security events to the receiver unit. Each receiver unit 209a, 209b can receive the collected security events from one of the publishers, and forward the security events to be queued, for example by the queuing unit 207.

In accordance with one or more embodiments, a collector can aggregate security events from security components. One or more collectors can be configured as desired for aggregating security events. Data in security events that are collected by a collector can be normalized, and the format can be standardized into one or more pre-selected formats.

The queuing unit 207 can queue one or more security events into the message bus 205. For example, the queuing unit 207 can receive the security event or retrieve the security event to be queued; determine a particular position in the message bus 205 responsive to, e.g., security event content or security event origin; and queue the security event into the queue at the particular position.

The transport unit 203 can retrieve security events from the message bus 205, and publish the security events to subscribers, e.g., subscribers 201a-201d, who have selected receipt of events such as the retrieved security event. The transport unit 203 can determine which of the subscribers the event is to be published to based on parameters including one or more of, for example, subscriber type, system to which the subscriber belongs, security event type, security event source, date/time, or any other parameter or combination of parameters as desired which are available from the security event in the message bus 205.

In accordance with one or more embodiments, the transport unit 203 can create a subscription list for one of more subscribers on request, and can modify the subscription list on request. Subscribers can subscribe to type of security events that they wish to receive. The transport unit 203 can have access to the subscription lists, and can use the subscription lists to determine which subscribers are to receive security events.

A meter unit 221 can be provided, responsive to the message bus 205. The meter unit can provide a window into the message bus 205, examining the state of the message bus and its components, and/or controlling message bus parameters and contents, and/or monitoring activity in the message bus 205. For example, the meter unit 221 can display metrics of the message bus 205 and/or the contents of the message bus 205 and/or any logical or physical subdivisions of the message bus 205. Metrics can include statistical summary and deviation information about security events entering and/or being transported from the message bus 205, and can reflect current and/or historical information.

Accordingly, one or more embodiments can provide a meter, responsive to security events in the message bus, to dynamically determine metrics of the security events in the message bus and to provide the metrics for further use. For example, the metrics can be provided for displays, statistics, reporting, alarming, and/or logging and the like.

One or more of the subscribers, for example, represented by subscriber A-D 201a-201d, can register as a subscriber, request service for particular events, and/or request automatic start of services.

The subscribers A-D 201a-201d, the transport unit 203, the queuing unit 207, the receiver units 209a-209b, and the collectors 211a-211b can execute on any host computer in communication with the message bus 205.

Any type of publish/subscribe implementation can be utilized, for example, list-based publish/subscribe, broadcast-based publish/subscribe, and content-based publish/subscribe. In list-based publish/subscribe, security events can be transported to particular subscribers based on a list; lists can be maintained for topics and associated subscribers to those topics; associated subscribers can be notified as an event with a particular topic occurs. In broadcast-based publish/subscribe, security events can be broadcast to all or a part of subscribers, and the subscribers can filter out unwanted security events. In content-based publish/subscribe, security events can be transported to particular subscribers based on the content of the security events.

In a message bus according to one or more list-based publish/subscribe embodiments, for a security event queued in the message bus 205, the transport unit 203 can look up interested subscribers and can send those subscribers a copy of the security event.

In a message bus according to one or more a broadcast-based publish/subscribe embodiments, for a security event queued in the message bus 205, the transport unit 203 can broadcast a security event to all the subscribers that are listening to the bus. The transport unit 203 does not need to determine the appropriate subscribers, because it is assumed that the subscribers can filter out unwanted security events.

In a message bus according to one or more content-based publish/subscribe embodiments, for a security event queued in the message bus 205, the transport unit 203 can match a security event against a subscription list indicating certain subscribers and then forward the security event to the indicated subscribers. To match the security event to certain subscribers, the transport unit 203 can judge whether there is a match between selected content in the security event a set of values corresponding to one or more subscribers; if a match exists between the security event content and subscriber(s), the security event can be forwarded to the matching subscribers.

Security events can be sent from the security components 213, 215, 217, 219. Security events are generally known in the industry. A security event can be a discrete packet of data including information which is typically defined by the manufacturer and can be particular to a type of security component, e.g., to a particular brand and product type or the like. The security event definition can provide for various information fields, sometimes referred to as "tags." For example, conventionally the manufacturer of a security component can define the particular tags and ranges of data to be expected in the particular tags, where the tags are associated with a type of security component.

Accordingly, one or more embodiments can provide for a computer-implemented device for providing security events from publishers to subscribers. The computer-implemented device can include a message bus, configured to contain a plurality of security events; a receiver unit, responsive to a plurality of publishers, to receive the plurality of security events from the publishers; a queue unit, responsive to receipt of the security events, to queue the plurality of security events in the message bus; and a transport unit, responsive to the security events in the message bus, to transport the plurality of security events in the message bus to a plurality of subscribers. One or more embodiments provide that the security events enter and exit the message bus in an orderly manner; more particularly, one or more embodiments provide that security events are queued and de-queued in the message bus in an orderly manner; even more particularly, one or more embodiments provide that there is a single message bus, a single queue unit interfacing with the message bus, and/or a single transport unit interface with the message bus.

Any process or device referencing, receiving, or forwarding a security event can filter the security event so that only information of further interest is passed along and/or stored. Any filtering can be done in accordance with pre-determined patterns.

For example, the collectors 211a, 211b, receiver unit 209a, 209b, and/or the queuing unit 207 can parse/normalize security events to achieve a standardized format, impose a taxonomy, add data as desired, and/or filter out based on relevance e.g. defined in a filter. As another example, the collectors 211a, 211b can include vulnerability data as one of the security events which can be forwarded for further processing, and can be eventually queued into the message bus 205. Vulnerability scanners are commercially available, can check security components and/or systems of security components against known vulnerabilities and can provide vulnerability data reporting potential security holes.

In accordance with the illustrated embodiment, it is not necessary for peer components (such as subscribers, receiver units, collectors, and security components) to communicate directly with each other.

One or more embodiments of the above-described subscribers, transport unit, queuing unit, receiver unit, and/or collector can utilize utilities, including taxonomy, business relevance, and/or exploit detection utilities. These are described below in more detail.

With regard to a taxonomy utility, security components can produce security events in different formats with varying content. The taxonomy utility can translate heterogeneous data of the security events into common terms and product homogeneous security events. Optionally, the taxonomy can filter selected security events out, or add additional data or context to the security events before they are forwarded for further processing.

With regard to the business relevance utility, business relevant contextual data can be indicated in a security event. Business relevant contextual data can include fields, customizable by a user, for indicating business unit, owner, asset value, and/or geography associated with a security event or responsive to data indicated in the security event. The business relevant contextual data can then be available for use in connection with downstream processing.

In connection with the exploit detection utility, attacks which have been detected can be notified to users. Also, the exploit detection utility can link intrusion detection system (IDS) signatures and vulnerability scanners (examples of vulnerability scanners are those referred to as ISS REAL SECURE, SNORT and NESSUS). Furthermore, the exploit detection utility can review vulnerability scan results which are loaded, parse the vulnerability scan results, and provide the results to collectors such as those associated with an IDS, so that the collector(s) associated with a particular IDS can assign a priority to security events in response to a priority for the particular IDS assigned in the vulnerability scan results.

Further, one or more embodiments of the exploit detection utility can alert users to a severity level of an attack against an asset. Moreover, one or more embodiments of the exploit detection utility can filter false positives and negatives.

Figure 3:
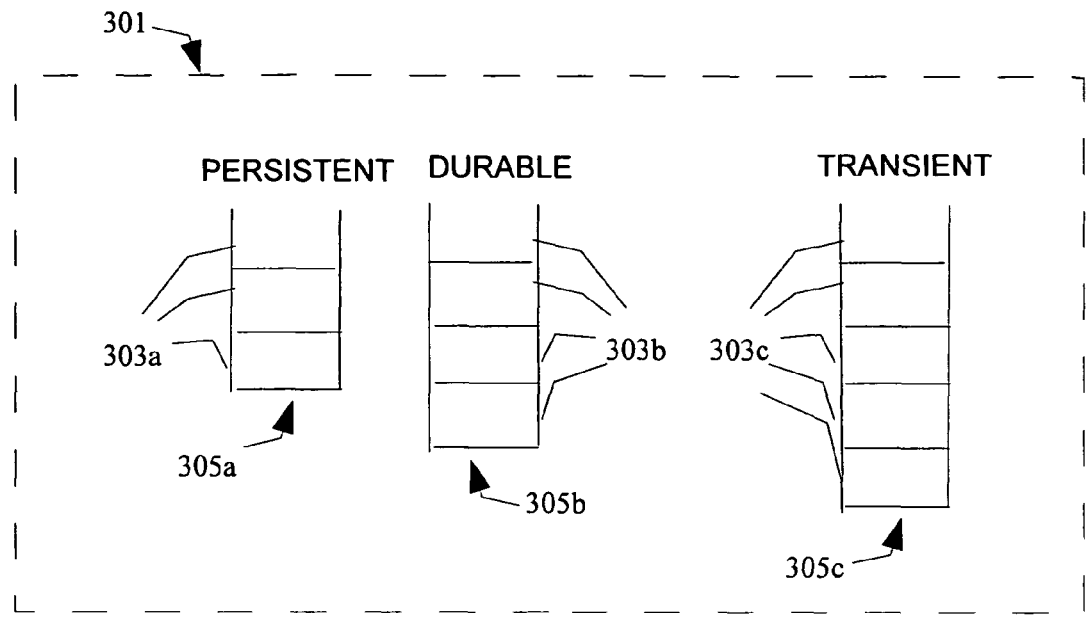
FIG. 3 is a block diagram illustrating exemplary queues of security events, in accordance with one or more embodiments.

Referring now to FIG. 3, a block diagram illustrating exemplary queues of security events in accordance with one or more embodiments will be discussed and described. An exemplary message bus 301 is illustrated, in which security events 303a, 303b, 303c can be queued for further processing and perhaps later access. The security events 303a, 303b, 303c that are received are placed in one or more queues in the message bus 301. Here, the illustrated message bus 301 can utilize at least one persistent queue 305a, at least one durable queue 305b, and at least one transient queue 305c. One or more alternative embodiments can utilize one or more persistent queues, durable queues, and/or transient queues.

Transient queues 305c can be provided in local memory, which can be cleared when the message bus task or processor running the message bus task terminates processing. Durable queues 305b can be provided in one or more files that can be stored for later access; the files remain even if the message bus task terminates processing. Persistent queues 305a can be provided in which security events can be stored in a database for later access. The message bus 301 can be defined so that events are queued into any combination of persistent, durable and transient queues 305a, 305b, 305c.

Accordingly, one or more embodiments provide that the message bus further includes a plurality of queues, each of the queues corresponding to a different priority, the priority being user-defined, wherein each of the security events is associated with a priority, and wherein the queue unit queues each security event in the corresponding queue.

By utilizing transient, durable and/or persistent queues, a user can determine reliability and fault tolerance. For instance, security events can be stored in the transient queue, and security events with selected indicia can be stored not only in the transient queue, but also in the durable queue.

In the event of a failure (such as a power failure), the security events in the durable queue can be recovered and re-processed. As another example, one or more security events with selected indicia can be stored not only in the transient queue, but also in the persistent queue; a security event in the persistent queue can remain there until another predetermined event occur (such as handling an alarm related to the security event.

The message bus can be provided in any appropriate implementation, for example, an IMS implementation, a Java implementation, a Linux implementation, variants thereof, or the like. One or more embodiments provide that the durable, persistent, and transient queues can be used alone, in combination with channels, and/or one or more of the channels can be provided as durable, persistent, and/or transient queues, as further described herein.

It will be appreciated that the use of the message bus as a queue can preserve a sequence of security events. Accordingly, one or more embodiments can be scaled by adding or omitting publishers and/or subscribers as desired, while continuing to preserve sequences of security events.

Figure 4:
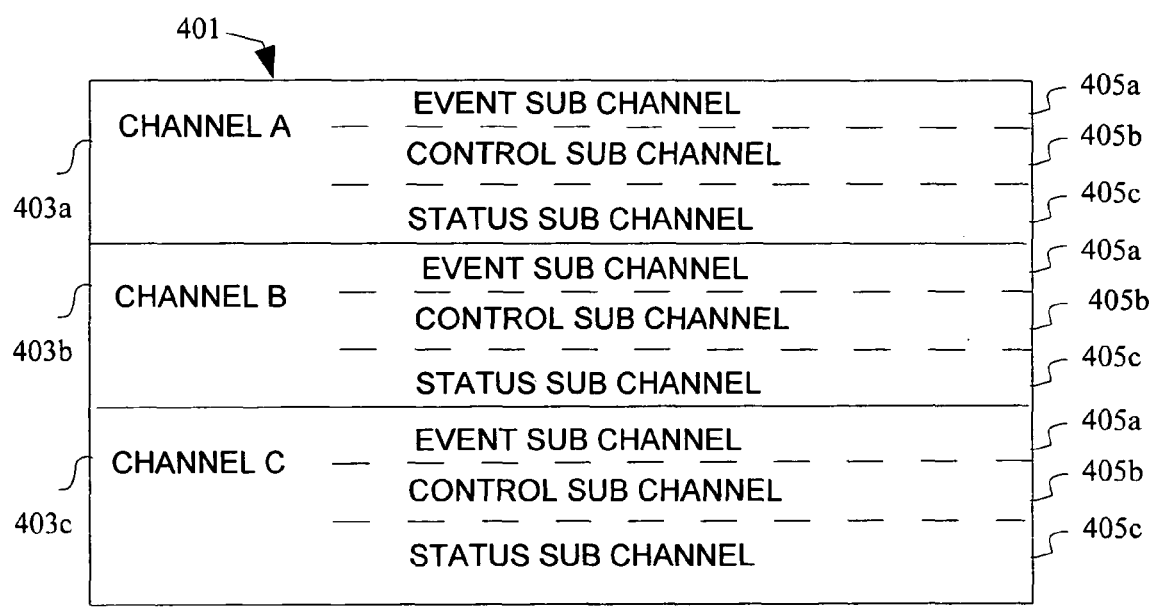
FIG. 4 is a block diagram illustrating an exemplary message bus of security events, in accordance with one or more embodiments.

Referring now to FIG. 4, a block diagram illustrating an exemplary message bus of security events in accordance with one or more embodiments will be discussed and described. The message bus 401 can further be divided into two or more different channels 403a-403c. The three channels illustrated in FIG. 4 are representative of any number of different channels.

Security events can be assigned to particular channels in response to the communication path (that is, the publisher of the event, the subscriber to the event, intermediate recipient(s) of the event, physical destination(s) of the event, or combination thereof), type of the security event, priority of the security event, other field in the security event, or the like, or combination thereof. In the illustrated embodiment, security events are assigned to particular channels in response to the communication path associated with the security event. In the illustrated embodiment, the communication path includes the subscriber to the event, where subscribers are grouped together by host computer, and a channel is assigned to the subscribers on one or more host computers. Where channels are related to a communication path, a problem or failure in one of the communication paths can avoid affecting other channels.

A channel can provide a minimal pre-determined bandwidth, for various security events in the message bus. One or more of the channels can be assigned a specified size, for example by interaction with an operator, or by being assigned a statistical size (such as average, maximum, minimum) associated with the security events assigned to or historically present in the particular channel. The specified size assigned to the channel(s) can be re-determined, for example, by re-calculating the statistical size. The time for re-determining can be set by a schedule, can be periodic, and/or can be responsive to contents of one or more channels 403a-403c or the message queue 401 reaching a threshold.

Accordingly, one or more embodiments provide that the message bus includes a plurality of channels, each of the channels corresponding to partitioned bandwidth reserved in the message bus responsive to predefined types of at least one of security events, aggregated security events, and security information; and wherein the queue unit queues the at least one of security events, aggregated security events, and security information in the corresponding channel.

Consequently, a configuration of one or more embodiments can be configured to allow for large numbers of security components having few security events; whereas another configuration can be configured to allow for a few security components with a large volume of security events.

A channel can carry data including data on security events. Optionally, a channel can carry information relating to the channel, that is status information and/or control information. Status information can indicate, for example, a status of a subscriber as it relates to its ability to receive security event information. Control information can indicate, for example, how communication to a subscriber is to be controlled, for example, to start up or shut down event reception, and/or more involved protocols for controlling communication to a subscriber.

In the illustrated embodiment, the message bus 401 includes channels A, B and C 403a-c. One or more embodiments provide that one or more of the channels can be further subdivided into sub-channels in response to, for example, a type of the security event, a priority of the security event, an other field in the security event, or the like, or combination thereof, and/or can control and status information separate from related data (security events). In the illustrated embodiment, separate sub-channels are provided to contain security event information (event sub-channels 405a), control information (control sub-channels 405b), and status information (status sub-channels 405c).

The utilization of multiple channels and/or sub-channels can promote the parallel processing of events and can reduce contention and/or permit arbitration for system resources.

In one or more realizations, a high throughput communication channel can have a high data throughput rate. Optionally, security events and related control and/or status information can be compressed and/or encrypted either before being queued or prior to transmission to a subscriber.

Figure 5:
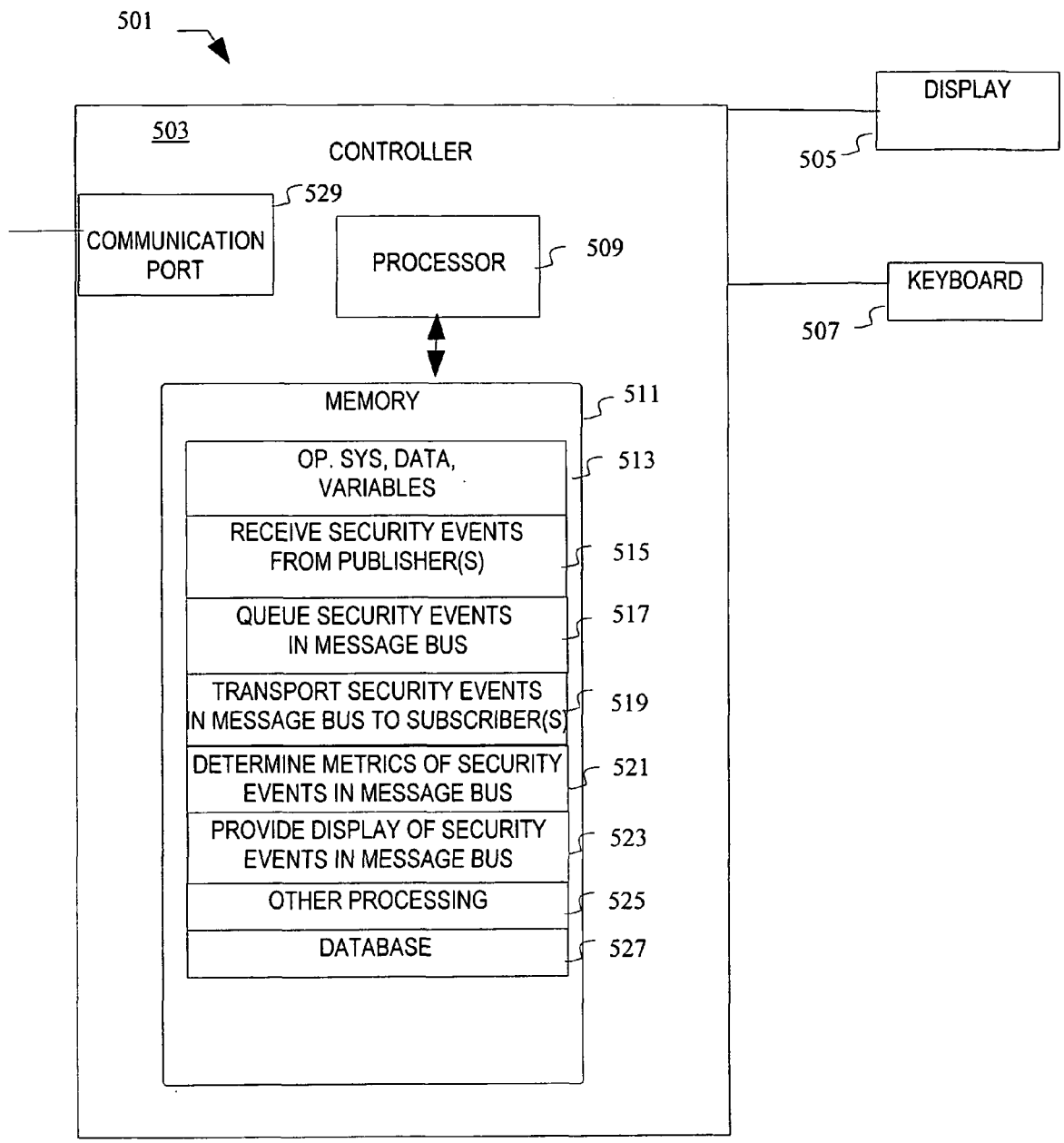
FIG. 5 is a block diagram illustrating portions of an exemplary computer, in accordance with various exemplary embodiments.

Referring now to FIG. 5, a block diagram illustrating portions of an exemplary computer in accordance with various exemplary embodiments will be discussed and described. The computer 501, such as a computer-implemented device, may include one or more controllers 503. The controller 503 can be operably connected to a communication port 529 for sending and receiving transmissions on a network, a text and/or image display 505, and/or a user input device such as a keyboard 507. The controller 503 can also include a processor 509 and a memory 511.

The processor 509 may comprise one or more microprocessors and/or one or more digital signal processors. The memory 511 may be coupled to the processor 509 and may comprise a read-only memory (ROM), a random-access memory (RAM), a programmable ROM (PROM), and/or an electrically erasable read-only memory (EEPROM). The memory 511 may include multiple memory locations for storing, among other things, an operating system, data and variables 513 for programs executed by the processor 509; computer programs for causing the processor to operate in connection with various functions such as receiving security events from publisher(s) 515, queuing security events in the message bus 517, transporting security events in the message bus to subscriber(s) 519, determining the metrics of security events in the message bus 521, providing a display of security events in the message bus 523, and other optional processing 525; a database 529 for example of information used in connection with the security event message bus; and a database (not illustrated) of other information used by the processor 509. The computer programs may be stored, for example, in ROM or PROM and may direct the processor 509 in controlling the operation of the computer 501.

The processor 509 may be programmed for receiving security events from one or more publisher(s) 515. The security events can have a variable length and can have different formats, as previously described. Optionally, vulnerability data can be received or otherwise obtained. Optionally, the received security events can be further associated with other data, such as vulnerability data. Further, optionally, non-security events may be received from one or more publisher(s). The security events can be forwarded for queuing in the message bus. One or more embodiments can provide that the non-security events and/or vulnerability data are also forwarded for queuing in the message bus. One or more embodiments can provide that the security events, non-security events and/or vulnerability data are transformed into a standard format before being forwarded for queuing in the message bus. Alternatively, all or a portion of the data in a security event can be homogeneous when received from the publisher. Additionally, one or more embodiments can provide that additional information, such as taxonomy, detection information, and/or business relevant information, can be associated with one or more of the security events that are to be queued in the message bus.

Accordingly, one or more embodiments provide that the receiver unit further receives vulnerability data, determines security events in the message bus corresponding thereto, and associates the vulnerability data with the corresponding security event or non-security event.

Further accordingly, one or more embodiments provide that the receiver unit further enriches the security events in the message bus by associating at least one of taxonomy, detection information, and business relevance information with at least some of the security events in the message bus.

The processor 509 may be programmed for queuing security events in the message bus 517. Security events which were forwarded for queuing can be placed in the message bus. One or more embodiments provide that the security events are queued in the same order as received. Alternative embodiments provide that the security events are queued in time order, e.g., responsive to a time stamp.

Further, one or more embodiments can provide persistent, durable, and/or transient queues; can check whether a security event is to be queued in one or more of the persistent, durable, and/or transient queues; and can queue the security event as indicated.

Moreover, one or more embodiments can provide plural channels in the message queue; can check first criteria for determining the one of the plural channels in which the security event is to be queued; and can queue the security event in the channel. Also, one or more embodiments can provide plural sub-channels in one or more channels; can check second criteria for determining the one of the plural sub-channels in which the security event is to be queued; and can queue the security event in the sub-channel.

One or more alternative embodiments can provide that the processor 509 can also queue non-security events and/or vulnerability data that were forwarded for queuing in the message bus. The non-security events and/or vulnerability data can be queued in persistent, durable, and/or transient queues, and/or in channels/sub-channels, in one or more embodiments.

The processor 509 may be programmed for transporting security events from the message bus to subscriber(s) 519. A subscriber can provide an indication of security events that are of interest. The security events which are in the message bus can be retrieved and transported to the appropriate subscribers. For example, a next security event can be obtained from the message bus and transported to those subscribers that have indicated that it is of interest. Where there are plural queues, plural channels and/or plural sub-channels in the message bus, any appropriate de-queuing algorithm may be utilized to determine the next queue, channel and sub-channel from which to obtain a security event. One or more alternative embodiments can provide that the processor 509 can also transport non-security events and/or vulnerability data that were queued in the message bus.

Optionally, one or more embodiments can provide that the processor 509 is programmed for determining the metrics of security events in the message bus 521. For example, the metrics can include statistics and deviation information about the security events that are in and/or have been in the message bus. Optionally, a log of information used for determining metrics can be collected and stored, for example, the most recent eight hours of security events. The metrics which are to be determined can be selective, and can include any portion of the information that is provided in the security events. One or more embodiments can also provide metrics on non-security events and/or vulnerability data that are queued in the message bus. The metrics can be forwarded for reporting, logging, and/or for display, for example on the text and/or image display 505.

The processor 509 may be programmed for providing a display of security events in the message bus 523. For example, the security events can be examined and selectively displayed to a user on the display 505 or other display device. The display can be dynamic, that is, updated to reflect security events currently in the message bus. The display can be updated dynamically on a periodic basis or as the content of the message bus changes. Alternatively, the display can be provided in hardcopy and/or stored in a file. The display of security events can be provided alone and/or in combination with a display of the metrics. One or more embodiments can also provide metrics on non-security events and/or vulnerability data that are queued in the message bus. Accordingly, one or more embodiments provides for a dynamic display representative of the security events in the message bus.

Optionally, other components may be incorporated in the computer 501 to produce other actions. For example, a user can interface with the computer 501, via a known user interface such as OUTLOOK, WINDOWS, and/or other commercially available interfaces. Further, the computer 501 can send and receive transmissions via known networking applications operating with the communications port 529 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the security events are received and queued, and accordingly the computer 501 can omit one or more functions of transporting security events in the message bus to subscribers 519, determining the metrics of security events in the message bus 521, and/or providing a display of security events in the message bus 523. Moreover, one or more embodiments can omit the function of receiving security events from publishers 515 and queuing security events in the message bus 517. Further, one or more embodiments can omit the functions of determining metrics of the security events 521 and/or providing a display of security events in the message bus 523. Also, in one or more embodiments, the functions of receiving security events 515, queuing security events 517, transporting security events in the message bus to subscribers 519 may be performed predominantly or entirely on one or more remote computers (not illustrated); and therefore such functions can be reduced or omitted from the processor 509 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The user may invoke functions accessible through the keyboard 507. As alternatives to the keyboard 507, or in addition to the keyboard 507, one or more other various known input devices can be provided, such as a keypad, a computer mouse, a touchpad, a touch screen, a trackball, and/or a pointing device. The keyboard is optional for one or more embodiments.

The computer 501 can include or be connected to the text and/or image display 505, upon which information may be displayed. The display is optional for one or more embodiments. The display 505 may present information to the user by way of a conventional liquid crystal display (LCD) or other visual display, and/or by way of a conventional audible device (such as a speaker, not illustrated) for playing out audible information.

The computer 501 can include one or more of the following, not illustrated: a floppy disk drive, a hard disk drive (not shown), and a CD ROM or digital video/versatile disk, at internal or external hard drives. The number and type of drives can vary, as is typical with different configurations, and may be omitted. Instructions for operating the processor 509 can be provided electronically, for example, from the drive, via the communication port 529, or via the memory 511. Accordingly, one or more embodiments provide for a computer-readable medium comprising instructions for execution by a computer, where the instructions include a computer-implemented method for processing security events.

Figure 6:
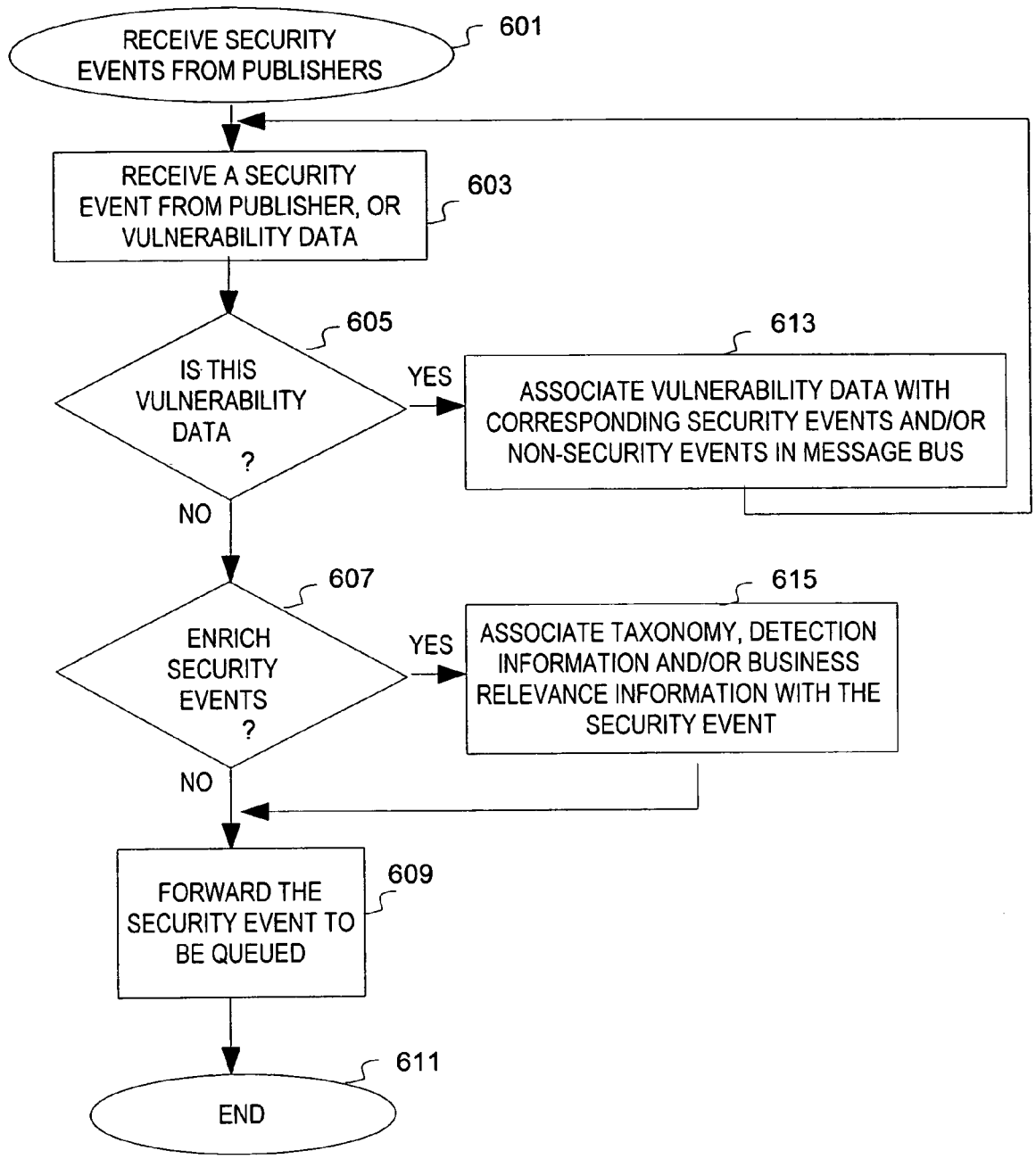
FIG. 6 is a flow chart illustrating an exemplary procedure for receiving security events from publishers, in accordance with various exemplary and alternative exemplary embodiments.
Figure 7:
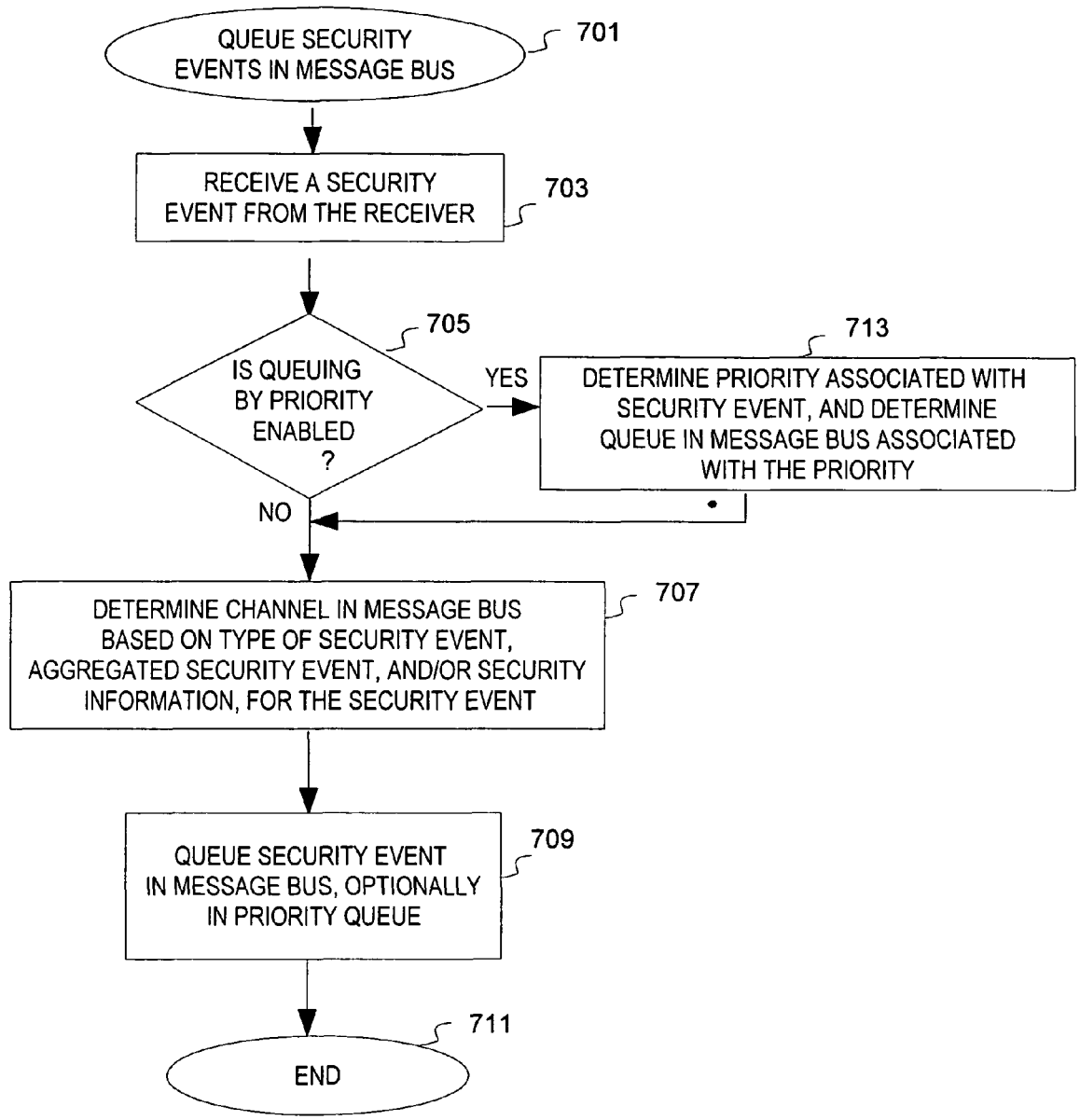
FIG. 7 is a flow chart illustrating an exemplary procedure for queuing security events in a message bus, in accordance with various exemplary and alternative exemplary embodiments.
Figure 8:
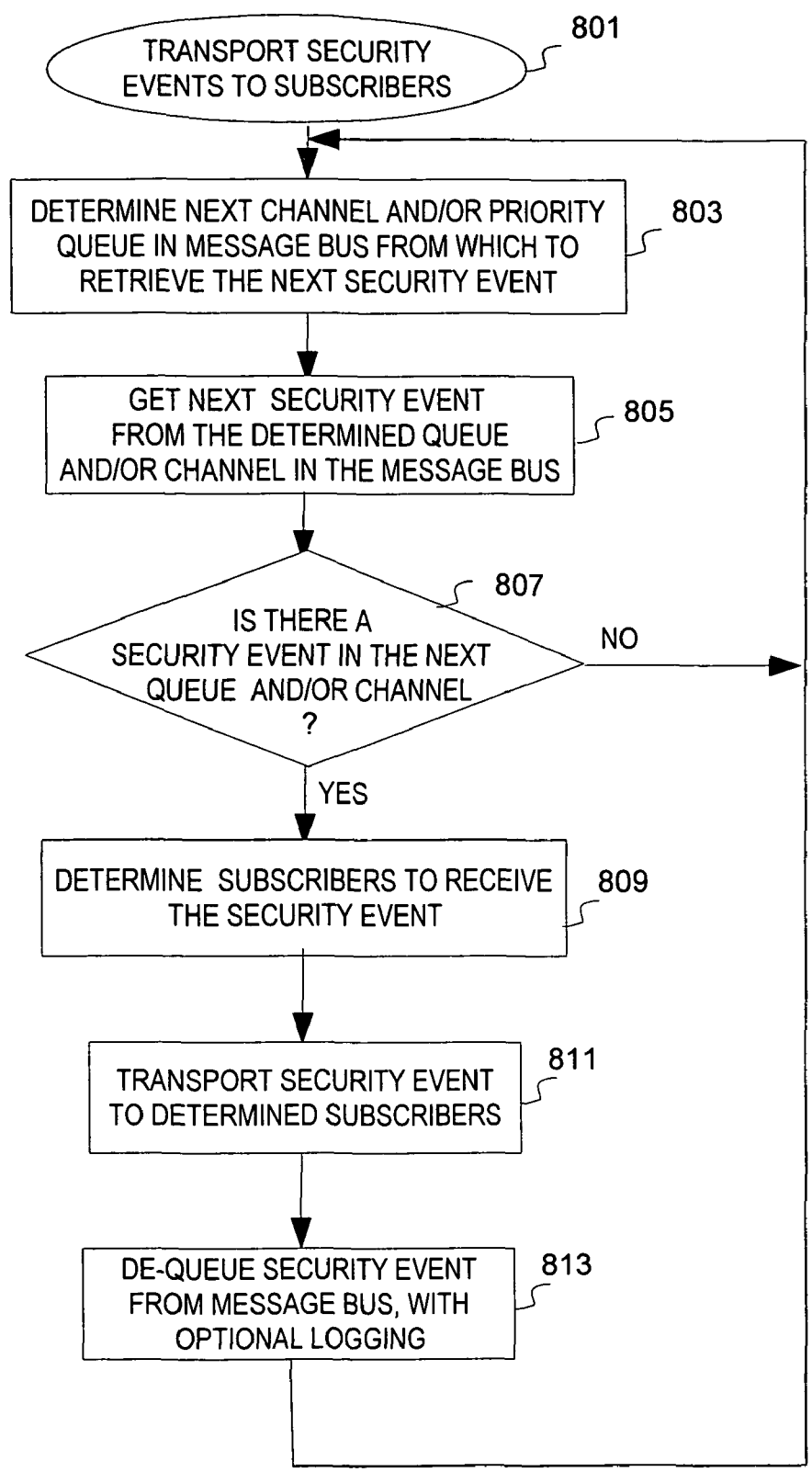
FIG. 8 is a flow chart illustrating an exemplary procedure for transporting security events to subscribers, in accordance with various exemplary and alternative exemplary embodiments.

FIG. 6, FIG. 7 and FIG. 8 are flow charts illustrating exemplary procedures for receiving security events from publishers, queuing security events in the message bus, and transporting security events to subscribers. Any of these procedures can advantageously be implemented on, for example, a processor of a controller, such as was described in connection with FIG. 5, or other apparatus appropriately arranged. Each of these illustrations is discussed below.

Accordingly, one or more embodiments can include a method for processing security events, including receiving a plurality of security events from at least one publisher; queuing the plurality of security events in a message bus, responsive to receipt thereof; and transporting, by a computer, the plurality of security events in the message bus to a plurality of subscribers.

Referring now to FIG. 6, a flow chart illustrating an exemplary procedure 601 for receiving security events from publishers, in accordance with various exemplary and alternative exemplary embodiments will be discussed and described. In overview, the procedure 601 provides for receiving 603 a security event from a publisher, or vulnerability data; checking 605 whether what was received is vulnerability data and if so, associating 613 vulnerability data with corresponding security events and/or non-security events in the message bus; checking 607 whether security events are to be enriched, and if so, associating 615 taxonomy, detection information and/or business relevance information with the security event; forwarding 609 the security event to be queued; and ending 611 processing. Each of these is discussed in more detail below.

The procedure 601 can include receiving 603 a security event from a publisher, or vulnerability data. Optionally, the security events that are received are provided in a standardized format. Each security event can be received and processed in real-time as it is received, rather than being received and processed in a batch mode or similar. Security events can be received from one or more publishers of events.

One or more embodiments of the procedure 601 can receive data that is not necessarily a security event, such as vulnerability data. Therefore, the procedure 601 can provide for checking 605 whether what was received is vulnerability data. If the data is vulnerability data, the procedure 601 can associate 613 the vulnerability data with corresponding security events and/or non-security events in the message bus. For example, the vulnerability data can specify that certain security components have an increased vulnerability; the procedure 601 can search the message bus for security events and/or non-security events related to those security components, and can associate information reflecting the increased vulnerability with those security events and/or non-security events. If the data was vulnerability data, the procedure 601 can loop to receive the next security event.

Further, the procedure 601 can provide for checking 607 whether security events are to be enriched, and if so, associating 615 taxonomy, exploit detection information and/or business relevance information with the security event. An indicator can be provided to instruct that security events are to be enriched. Such an indicator can be, for example, a parameter referenced by the procedure and/or a parameter associated with a particular security event. If security events are to be enriched, additional information can be included in the security event. For example, the procedure 601 can associated 615 taxonomy, detection information and/or business relevance information (discussed above) with the security event.

The procedure 601 also can provide for forwarding 609 the security event to be queued, for queuing in the message bus, in accordance with a procedure for queuing the security events. For example, a message with the security event can be transmitted to the procedure for queuing the security events. Thereafter, processing of the security event ends 611.

Referring now to FIG. 7, a flow chart illustrating an exemplary procedure 701 for queuing security events in a message bus, in accordance with various exemplary and alternative exemplary embodiments will be discussed and described. The procedure 701 generally can include the following: receiving 703 a security event from the receiver; determining 705 whether queuing by priority is enabled, and if so, determining 713 the priority associated with the security event and determining the queue in the message bus associated with the priority; determining 707 the channel in the message bus in which to queue the security event; queuing 709 the security event in the message bus and optionally in the priority queue; and ending 711 the procedure. Each of the foregoing is explained in more detail below. The procedure 701 can be repeated as desired to handle entries in the message bus.

The procedure 701 can provide for receiving 703 a security event, where the security event has likely been sent from the receiver. Security events can be received in accordance with any convention method for communicating between procedures. The method of receiving security events can reflect the order in which the security events were received, so that security events can be processed in the order in which they occurred. One or more embodiments can provide analogous processing for handling non-security events.

Further, once the security event has been received, the procedure 701 can provide for determining 705 whether queuing by priority is enabled. Priority queuing enabled can be indicated, for example, by an indicator in the procedure 701 or in the security event. If queuing by priority is enabled, the procedure 701 can provide for determining 713 the priority associated with the security event, for example from a field in the security event, a table listing security components with priority, or the like. The procedure 701 can then determine the queue in the message bus associated with the priority. Optionally, more than one queue can be associated with a priority.

Having determined a priority queue (if any), the procedure 701 also can provide for determining 707 the channel in the message bus (or in the priority queue) in which to queue the security event. One or more embodiments also provides for determining the channel in which to queue an aggregated security event, and/or security information, for the security event. For example, this procedure 701 or another procedure can collect information on plural security events and forward the aggregated security event information just as it would a security event, for queuing into the message bus. Additionally, the procedure 701 can provide for determining any sub-channel in which to queue the security event and/or information derived from the security event. If, for example, there are sub-channels for holding specific subsets of security events, the procedure 701 can determine which sub-channel corresponds to the security event, security event information, or non-security event.

Also, the procedure 701 can provide for queuing 709 the security event in the message bus and optionally in the priority queue. The security event can be queued into the message bus, channel and/or sub-channel, and in one or more particular priority queues, in accordance with conventional queuing techniques. Thereafter, the procedure can end 711.

Referring now to FIG. 8, a flow chart illustrating an exemplary procedure 801 for transporting security events to subscribers, in accordance with various exemplary and alternative exemplary embodiments will be discussed and described. In overview, the procedure 801 can include determining 803 the next channel and/or queue in the message bus from which to retrieve the next security event; getting 805 the next security event; and if 807 there is a next security event, determining 809 the subscribers for the security event; transporting 811 the security event to those subscribers; and de-queuing 813 the security event from the message bus. Each of these is described in more detail below.

The procedure 801 can provide for determining 803 the next channel and/or queue in the message bus from which to retrieve the next security event. If the message bus has plural priority queues, channels, and/or subchannels, the procedure 801 must determine from which one to get the security event. The order in which the priority queues, channels, and/or sub-channels are handled can be defined in accordance with various known techniques. For example, a round-robin de-queuing technique may call for handling one security event from each sub-channel, in round-robin order. Alternatively, a de-queuing technique may call for handling all of the security events in the highest priority queue first, before turning to a next lower priority queue. Other de-queuing techniques and variation may be implemented, as well.

Also, the procedure 801 can provide for getting 805 the next security event from the determined queue, channel, and/or sub-channel, once it is determine where to retrieve the next security event. If there is no next security event in the determined queue, channel, and/or sub-channel, the procedure 801 can loop to repeat the foregoing steps, i.e., to determine the next priority queue, channel or sub-channel from which to retrieve the next security event.

Further, the procedure 801 can provide, if 807 there is a next event, determining 809 the subscribers that are to receive the security event. Consider an example where the subscribers have indicated types of security events to which they subscribe. The procedure 801 can maintain a list of security event types and corresponding subscribers. Once the security event is retrieved, the subscription list can be reviewed to determine corresponding subscribers.

Also, the procedure 801 can provide for transporting 811 the security event to those subscribers. The security event is communicated to those subscribers that are to receive the security event in accordance with any of several known communication techniques. For example, if one of the subscribers is a local process, then for example an inter-process communication can notify the subscriber of the security event; if one of the subscribers is connected via the Internet, the communication can be performed in accordance with Internet protocol. The security event can be communication to all of the indicated subscribers.

The procedure 801 can then provide for de-queuing 813 the security event from the message bus. Optionally, information representative of the security event and the transport transaction (e.g., date, time, subscribers) can be logged. Having handled a security event in the message bus, the procedure 801 can repeatedly loop through the message bus to handle other security events in the message bus.

A communications capability that may be utilized in connection with one or more embodiments can include, for example, short range wireless communications capability normally referred to as WLAN (wireless local area network) capabilities, such as IEEE 802.11, Bluetooth, or Hiper-Lan and the like using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively communications may be provided in accordance with a LAN using protocols such as TCP/IP, UDP/UP, IPX/SPX, or Net BIOS via a hardwired interface such as a cable and/or a connector.

Furthermore, the security components of interest may include, without being exhaustive, security perimeter resources, referential information technology sources, operating systems, and application events, more particularly referred to as firewalls, routers, intrusion detection systems, scanners, bridges, routers, switches, computer terminals, laptops, workstations, servers, mainframes, virtual packet networks (VPN), anti-virus applications, host intrusion detection system (IDS), network IDS, asset management, patch management, identity management, vulnerability management, business applications, domain controllers, custom applications generating events, relational data base management systems (RDBMS), and the like, although other examples are possible as will be appreciated by one of skill in the art. Security components can be programmed to detect and transmit an event, where the event includes data corresponding to a security event, in accordance with known techniques. Security components that are connected to a server can communicate in accordance with one or more of various known protocols. For example, some security components communicate in accordance with SNMP protocol, others via SYSLOG messages, some via serial communication protocol, etc. The server can receive the event transmitted by the security component, and can recognize the event, as is taught in accordance with conventional techniques, and hence will not be further described herein.

One or more embodiments may be utilized in connection with a general purpose computer, a specially programmed special purpose computer, a personal computer, a distributed computer system, calculators, handheld, laptop/notebook, mini, mainframe, and super computers, as well as networked combinations of the same.

One or more embodiments may rely on the integration of various components including, as appropriate and/or if desired, hardware and software servers, database engines, and/or other content providers. One or more embodiments may be connected over a network, for example the Internet, an intranet, or even on a single computer system. Moreover, portions can be distributed over one or more computers, and some functions may be distributed to other hardware, in accordance with one or more embodiments.

Further, portions of various embodiments can be provided in any appropriate electronic format, including, for example, provided over a communication line as electronic signals, provided on floppy disk, provided on CD ROM, provided on optical disk memory, etc.

Any presently available or future developed computer software language and/or hardware components can be employed in various embodiments. For example, at least some of the functionality discussed above could be implemented using Visual Basic, C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer device for security event transport using a message bus, comprising:
    a message bus comprising a transient queue provided in a local memory on the computer device and having a first plurality of channels, a durable queue provided in one or more files stored on the computer device and having a second plurality of channels, and a persistent queue provided in a database communicatively coupled to the computer device and having a third plurality of channels;
    a receiver unit configured to receive a plurality of security events from a plurality of publishers communicatively coupled to the computer device;
    a queue unit configured to queue the plurality of security events received from the plurality of publishers in the message bus, wherein the queue unit includes a processor further configured to:
        queue a first subset of the plurality of security events within one or more of the first plurality of channels in the transient queue, wherein the processor clears the first subset of the plurality of security events from the local memory that provides the transient queue in response to determining that one or more tasks running on the message bus have terminated;
        queue a second subset of the plurality of security events within one or more of the second plurality of channels in the durable queue, wherein the processor recovers the second subset of the plurality of security events from the one or more files that provide the durable queue in response to determining that the one or more tasks running on the message bus have failed; and
        queue a third subset of the plurality of security events within one or more of the third plurality of channels in the persistent queue, wherein the processor removes the third subset of the plurality of security events from the database that provides the persistent queue in response to determining that one or more predetermined events have occurred; and
    a transport unit configured to transport the plurality of security events queued in the message bus to a plurality of subscribers, wherein the transport unit transports the first subset of the plurality of security events queued in the transient queue to a first subset of the plurality of subscribers, transports the second subset of the plurality of security events queued in the durable queue to a second subset of the plurality of subscribers, and transports the third subset of the plurality of security events queued in the persistent queue to a third subset of the plurality of subscribers.

2. The computer device of claim 1, wherein the processor included in the queue unit is further configured to:
    queue the first subset of the plurality of security events within one or more of the second plurality of channels in the durable queue in response to determining that the first subset of the plurality of security events have one or more predetermined indicia, wherein the second subset of the plurality of security events includes the first subset of the plurality of security events; and
    queue the first subset of the plurality of security events within one or more of the third plurality of channels in the persistent queue in response to determining that the first subset of the plurality of security events have the one or more predetermined indicia, wherein the third subset of the plurality of security events includes the first subset of the plurality of security events.

3. The computer device of claim 1, further comprising a meter configured to:
    examine a state of the message bus; and
    dynamically determine statistical metrics for partitioning bandwidth in the message bus from the examined state of the message bus.

4. The computer device of claim 3, wherein the message bus is configured to:
reserve a first portion of the bandwidth in the message bus to the transient queue based on the statistical metrics dynamically determined from the examined state of the message bus;
reserve a second portion of the bandwidth in the message bus to the durable queue based on the statistical metrics dynamically determined from the examined state of the message bus; and
reserve a third portion of the bandwidth in the message bus to the persistent queue based on the statistical metrics dynamically determined from the examined state of the message bus.

5. The computer device of claim 4, wherein the message bus is configured to:
partition the first portion of the bandwidth reserved to the transient queue among the first plurality of channels in the transient queue based on the dynamically determined statistical metrics;
partition the second portion of the bandwidth reserved to the durable queue among the second plurality of channels in the durable queue based on the dynamically determined statistical metrics; and
partition the third portion of the bandwidth reserved to the persistent queue among the third plurality of channels in the persistent queue based on the dynamically determined statistical metrics.

6. The computer device of claim 5, wherein the message bus partitions the first portion of the bandwidth reserved to the transient queue, the second portion of the bandwidth reserved to the durable queue, and the third portion of the bandwidth reserved to the persistent queue at one or more of a scheduled time, a periodic interval, or in response to the dynamically determined statistical metrics reaching a threshold.

7. The computer device of claim 1, wherein the plurality of channels in the transient queue, the durable queue, and the persistent queue provide different communication paths between the plurality of publishers and the plurality of subscribers, and wherein the queue unit is further configured to:
determine communication paths between the plurality of publishers and the first subset of the plurality of subscribers, the second subset of the plurality of subscribers, and from the third subset of the plurality of subscribers; and
queue the first subset of the plurality of security events in the transient queue, the second subset of the plurality of security events in the durable queue, and the third subset of the plurality of security events in the persistent queue based on the determined communication paths.

8. The computer device of claim 1, wherein at least one of the first plurality of channels in the transient queue, at least one of the second plurality of channels in the durable queue, or at least one of the third plurality of channels in the persistent queue include:
an event sub-channel configured to carry information relating to security events queued in the at least one channel;
a control sub-channel configured to carry information for controlling communication relating to the security events queued in the at least one channel with at least one of the plurality of subscribers; and
a status sub-channel configured to carry information relating to a status associated with the at least one of the plurality of subscribers.

9. The computer device of claim 1, wherein the transient queue has a first priority, the durable queue has a second priority, and the persistent queue has a third priority, and wherein the queue unit is further configured to:
queue the first subset of the plurality of security events in the transient queue in response to determining that the first subset of the plurality of security events has the first priority;
queue the second subset of the plurality of security events in the durable queue in response to determining that the second subset of the plurality of security events has the second priority; and
queue the third subset of the plurality of security events in the persistent queue in response to determining that the third subset of the plurality of security events has the third priority.

10. A computer-implemented method for security event transport using a message bus, comprising:
providing a message bus on a computer device, wherein the message bus comprises a transient queue provided in a local memory on the computer device and having a first plurality of channels, a durable queue provided in one or more files stored on the computer device and having a second plurality of channels, and a persistent queue provided in a database communicatively coupled to the computer device and having a third plurality of channels;
receiving, at a receiver unit communicatively coupled to the computer device, a plurality of security events from a plurality of publishers;
queuing, by a queue unit, a first subset of the plurality of security events within one or more of the first plurality of channels in the transient queue, wherein the queue unit clears the first subset of the plurality of security events from the transient queue in response to determining that one or more tasks running on the message bus have terminated;
queuing, by the queue unit, a second subset of the plurality of security events within one or more of the second plurality of channels in the durable queue, wherein the queue unit recovers the second subset of the plurality of security events from the one or more files that provide the durable queue in response to determining that the one or more tasks running on the message bus have failed;
queuing, by the queue unit, a third subset of the plurality of security events within one or more of the third plurality of channels in the persistent queue, wherein the queue unit removes the third subset of the plurality of security events from the database that provides the persistent queue in response to determining that one or more predetermined events have occurred; and
transporting, by a transport unit, the plurality of security events queued in the message bus to a plurality of subscribers, wherein the transport unit transports the first subset of the plurality of security events queued in the transient queue to a first subset of the plurality of subscribers, transports the second subset of the plurality of security events queued in the durable queue to a second subset of the plurality of subscribers, and transports the third subset of the plurality of security events queued in the persistent queue to a third subset of the plurality of subscribers.

11. The method of claim 10, further comprising:
queuing the first subset of the plurality of security events within one or more of the second plurality of channels in the durable queue in response to determining that the first subset of the plurality of security events have one or more predetermined indicia, wherein the second subset of the plurality of security events includes the first subset of the plurality of security events; and queuing the first subset of the plurality of security events within one or more of the third plurality of channels in the persistent queue in response to determining that the first subset of the plurality of security events have the one or more predetermined indicia, wherein the third subset of the plurality of security events includes the first subset of the plurality of security events.

12. The method of claim 10, further comprising:
examining a state of the message bus; and
dynamically determining statistical metrics for partitioning bandwidth in the message bus from the examined state of the message bus.

13. The method of claim 12, further comprising:
reserving a first portion of the bandwidth in the message bus to the transient queue based on the statistical metrics dynamically determined from the examined state of the message bus;
reserving a second portion of the bandwidth in the message bus to the durable queue based on the statistical metrics dynamically determined from the examined state of the message bus; and
reserving a third portion of the bandwidth in the message bus to the persistent queue based on the statistical metrics dynamically determined from the examined state of the message bus.

14. The method of claim 13, further comprising:
partitioning the first portion of the bandwidth reserved to the transient queue among the first plurality of channels in the transient queue based on the dynamically determined statistical metrics;
partitioning the second portion of the bandwidth reserved to the durable queue among the second plurality of channels in the durable queue based on the dynamically determined statistical metrics; and
partitioning the third portion of the bandwidth reserved to the persistent queue among the third plurality of channels in the persistent queue based on the dynamically determined statistical metrics.

15. The method of claim 14, wherein the message bus partitions the first portion of the bandwidth reserved to the transient queue, the second portion of the bandwidth reserved to the durable queue, and the third portion of the bandwidth reserved to the persistent queue at one or more of a scheduled time, a periodic interval, or in response to dynamically determined statistical metrics reaching a threshold.

16. The method of claim 10, wherein the plurality of channels in the transient queue, the durable queue, and the persistent queue provide different communication paths between the plurality of publishers and the plurality of subscribers, and wherein the method further comprises:
determining communication paths between the plurality of publishers and the first subset of the plurality of subscribers, the second subset of the plurality of subscribers, and the third subset of the plurality of subscribers; and
queuing the first subset of the plurality of security events in the transient queue, the second subset of the plurality of security events in the durable queue, and the third subset of the plurality of security events in the persistent queue based on the determined communication paths.

17. The method of claim 10, wherein at least one of the first plurality of channels in the transient queue, at least one of the second plurality of channels in the durable queue, or at least one of the third plurality of channels in the persistent queue include:

an event sub-channel configured to carry information relating to security events queued in the at least one channel;
a control sub-channel configured to carry information for controlling communication relating to the security events queued in the at least one channel with at least one of the plurality of subscribers; and
a status sub-channel configured to carry information relating to a status associated with the at least one of the plurality of subscribers.

18. The method of claim 10, wherein the transient queue has a first priority, the durable queue has a second priority, and the persistent queue has a third priority, and wherein the method further comprises:
queuing the first subset of the plurality of security events in the transient queue in response to the queue unit determining that the first subset of the plurality of security events has the first priority;
queuing the second subset of the plurality of security events in the durable queue in response to the queue unit determining that the second subset of the plurality of security events has the second priority; and
queuing the third subset of the plurality of security events in the persistent queue in response to the queue unit determining that the third subset of the plurality of security events has the third priority.

19. A non-transitory computer readable medium comprising computer-executable instructions for security event transport using a message bus, wherein executing the computer-executable instructions on a computer device causes the computer device to:
provide a message bus on the computer device, wherein the message bus comprises a transient queue provided in a local memory on the computer device and having a first plurality of channels, a durable queue provided in one or more files stored on the computer device and having a second plurality of channels, and a persistent queue provided in a database communicatively coupled to the computer device and having a third plurality of channels;
receive, at a receiver unit communicatively coupled to the computer device, a plurality of security events from a plurality of publishers;
queue, by a queue unit, a first subset of the plurality of security events within one or more of the first plurality of channels in the transient queue, wherein the queue unit clears the first subset of the plurality of security events from the transient queue in response to determining that one or more tasks running on the message bus have terminated;
queue, by the queue unit, a second subset of the plurality of security events within one or more of the second plurality of channels in the durable queue, wherein the queue unit recovers the second subset of the plurality of security events from the one or more files that provide the durable queue in response to determining that the one or more tasks running on the message bus have failed;
queue, by the queue unit, a third subset of the plurality of security events within one or more of the third plurality of channels in the persistent queue, wherein the queue unit removes the third subset of the plurality of security events from the database that provides the persistent queue in response to determining that one or more predetermined events have occurred; and
transport, by a transport unit, the plurality of security events queued in the message bus to a plurality of subscribers, wherein the transport unit transports the first subset of the plurality of security events queued in the transient queue to a first subset of the plurality of subscribers, transports the second subset of the plurality of security events queued in the durable queue to a second subset of the plurality of subscribers, and transports the third subset of the plurality of security events queued in the persistent queue to a third subset of the plurality of subscribers.

20. The non-transitory computer readable medium of claim 19, wherein executing the computer-executable instructions on the computer device further causes the computer device to:
   queue the first subset of the plurality of security events within one or more of the second plurality of channels in the durable queue in response to determining that the first subset of the plurality of security events have one or more predetermined indicia, wherein the second subset of the plurality of security events includes the first subset of the plurality of security events; and
   queue the first subset of the plurality of security events within one or more of the third plurality of channels in the persistent queue in response to determining that the first subset of the plurality of security events have the one or more predetermined indicia, wherein the third subset of the plurality of security events includes the first subset of the plurality of security events.

21. The non-transitory computer readable medium of claim 19, wherein executing the computer-executable instructions on the computer device further causes the computer device to:
   examine a state of the message bus; and
   dynamically determine statistical metrics for partitioning bandwidth in the message bus from the examined state of the message bus.

22. The non-transitory computer readable medium of claim 21, wherein executing the computer-executable instructions on the computer device further causes the computer device to:
   reserve a first portion of the bandwidth in the message bus to the transient queue based on the statistical metrics dynamically determined from the examined state of the message bus;
   reserve a second portion of the bandwidth in the message bus to the durable queue based on the statistical metrics dynamically determined from the examined state of the message bus; and
   reserve a third portion of the bandwidth in the message bus to the persistent queue based on the statistical metrics dynamically determined from the examined state of the message bus.

23. The non-transitory computer readable medium of claim 22, wherein executing the computer-executable instructions on the computer device further causes the computer device to:
   partition the first portion of the bandwidth reserved to the transient queue among the first plurality of channels in the transient queue based on the dynamically determined statistical metrics;
   partition the second portion of the bandwidth reserved to the durable queue among the second plurality of channels in the durable queue based on dynamically determined statistical metrics; and
   partition the third portion of the bandwidth reserved to the persistent queue among the third plurality of channels in the persistent queue based on dynamically determined statistical metrics.

24. The non-transitory computer readable medium of claim 23, wherein executing the computer-executable instructions on the computer device further causes the computer device to partition the first portion of the bandwidth reserved to the transient queue, the second portion of the bandwidth reserved to the durable queue, and the third portion of the bandwidth reserved to the persistent queue at one or more of a scheduled time, a periodic interval, or in response to dynamically determined statistical metrics reaching a threshold.

25. The non-transitory computer readable medium of claim 19, wherein the plurality of channels in the transient queue, the durable queue, and the persistent queue provide different communication paths between the plurality of publishers and the plurality of subscribers, and wherein executing the computer-executable instructions on the computer device further causes the computer device to:
   determine communication paths between the plurality of publishers and the first subset of the plurality of subscribers, the second subset of the plurality of subscribers, and the third subset of the plurality of subscribers; and
   queue the first subset of the plurality of security events in the transient queue, the second subset of the plurality of security events in the durable queue, and the third subset of the plurality of security events in the persistent queue based on the determined communication paths.

26. The non-transitory computer readable medium of claim 19, wherein at least one of the first plurality of channels in of the transient queue, at least one of the second plurality of channels in the durable queue, or at least one of the third plurality of channels in the persistent queue include:
   an event sub-channel configured to carry information relating to security events queued in the at least one channel;
   a control sub-channel configured to carry information for controlling communication relating to the security events queued in the at least one channel with at least one of the plurality of subscribers; and
   a status sub-channel configured to carry information relating to a status associated with the at least one of the plurality of subscribers.

27. The non-transitory computer readable medium of claim 19, wherein the transient queue has a first priority, the durable queue has a second priority, and the persistent queue has a third priority, and wherein executing the computer-executable instructions on the computer device further causes the computer device to:
   queue the first subset of the plurality of security events in the transient queue in response to the queue unit determining that the first subset of the plurality of security events has the first priority;
   queue the second subset of the plurality of security events in the durable queue in response to the queue unit determining that the second subset of the plurality of security events has the second priority; and
   queue the third subset of the plurality of security events in the persistent queue in response to the queue unit determining that the third subset of the plurality of security events has the third priority.

* * * * *